(12) United States Patent
Kaercher

(10) Patent No.: US 8,154,562 B2
(45) Date of Patent: Apr. 10, 2012

(54) METHOD AND ARRANGEMENT FOR IMPROVING THE GRAYSCALE RESOLUTION OF A MONOCHROME MONITOR

(75) Inventor: Andreas Kaercher, Weingarten (DE)

(73) Assignee: Eizo GmbH (DE)

( * ) Notice: Subject to any disclaimer, the term of this patent is extended or adjusted under 35 U.S.C. 154(b) by 985 days.

(21) Appl. No.: 12/130,490

(22) Filed: May 30, 2008

(65) Prior Publication Data
US 2008/0297533 A1 Dec. 4, 2008

(30) Foreign Application Priority Data
Jun. 1, 2007 (DE) .................. 10 2007 025 504

(51) Int. Cl.
G09G 5/02 (2006.01)
G06K 9/36 (2006.01)
G06K 9/46 (2006.01)
(52) U.S. Cl. ........ 345/600; 382/166; 382/232; 382/233; 382/237; 382/244; 382/246; 382/247
(58) Field of Classification Search .................. 345/600; 382/166, 232, 233, 237, 244, 246, 247
See application file for complete search history.

(56) References Cited

U.S. PATENT DOCUMENTS

| | | | | |
|---|---|---|---|---|
| 5,373,327 | A * | 12/1994 | McGee et al. | 348/645 |
| 5,670,986 | A * | 9/1997 | Leak | 345/604 |
| 6,075,887 | A * | 6/2000 | Brett | 382/167 |
| 6,654,504 | B2 * | 11/2003 | Lubin et al. | 382/254 |
| 2005/0083342 | A1 * | 4/2005 | Ho et al. | 345/596 |
| 2005/0207661 | A1 * | 9/2005 | Miyagi et al. | 382/232 |
| 2007/0279433 | A1 * | 12/2007 | Huang | 345/601 |
| 2008/0158609 | A1 * | 7/2008 | Chan | 358/3.01 |

OTHER PUBLICATIONS

Internet Encyclopedia "Wikipedia": "RGB color space", accessed Dec. 16, 2006, pp. 1-3, bibliographic listing, http://web.archive.org/web/20061216165733/http://de.wikipedia.org/wiki/RGB-Farbraum; eHB.
Internet Encyclopedia "Wikipedia": "luminance", accessed Sep. 4, 2006, 1 page & bibliographic listing, http://web.archive.org/web/20061216165733/http://de.wikipedia.org/wiki/RGB-Farbraum; eHB.

* cited by examiner

Primary Examiner — Jeffrey Chow
(74) Attorney, Agent, or Firm — Ostrolenk Faber LLP

(57) ABSTRACT

A method and an arrangement for improving the digital-signal-generated grayscale resolution of a monochrome visual display unit (3) to which the digital signals from an image source (1) can be supplied over n-bit wide RGB channels (2). Measures are proposed that make it possible to display distinguishable grayscale gradations on the visual display unit (3) regardless of whether a grayscale signal (6; 10) or RGB color signals (12, 13, 14) are transmitted to the visual display unit (3).

9 Claims, 3 Drawing Sheets

FIG 2

| | D9 | D8 | D7 | D6 | D5 | D4 | D3 | D2 | D1 | D0 |
|---|---|---|---|---|---|---|---|---|---|---|
| 10~ | 0 | 1 | 1 | 1 | 1 | 1 | 1 | 1 | 0 | 1 |

| | R7 | R6 | R5 | R4 | R3 | R2 | R1 | R0=D2 |
|---|---|---|---|---|---|---|---|---|
| R~ | 0 | 1 | 1 | 1 | 1 | 1 | 1 | 1 |

| | G7 | G6 | G5 | G4 | G3 | G2 | G1 | G0=D1 |
|---|---|---|---|---|---|---|---|---|
| G~ | 0 | 1 | 1 | 1 | 1 | 1 | 1 | 0 |

| | B7 | B6 | B5 | B4 | B3 | B2 | B1 | B0=D0 |
|---|---|---|---|---|---|---|---|---|
| B~ | 0 | 1 | 1 | 1 | 1 | 1 | 1 | 1 |

| | D9=R7=G7=B7 | D8=R6=G6=B6 | D7=R5=G5=B5 | D6=R4=G4=B4 | D5=R3=G3=B3 | D4=R2=G2=B2 | D3=R1=G1=B1 | D2 | D1 | D0 |
|---|---|---|---|---|---|---|---|---|---|---|
| 11~ | 0 | 1 | 1 | 1 | 1 | 1 | 1 | 1 | 0 | 1 |

FIG 3

| | R7 | R6 | R5 | R4 | R3 | R2 | R1 | R0 |
|---|---|---|---|---|---|---|---|---|
| 12 | 1 | 1 | 1 | 1 | 1 | 1 | 1 | 1 |

| | G7 | G6 | G5 | G4 | G3 | G2 | G1 | G0 |
|---|---|---|---|---|---|---|---|---|
| 13 | 1 | 1 | 1 | 1 | 1 | 1 | 1 | 1 |

| | B7 | B6 | B5 | B4 | B3 | B2 | B1 | B0 |
|---|---|---|---|---|---|---|---|---|
| 14 | 0 | 0 | 0 | 0 | 0 | 0 | 0 | 0 |

| | R7 | R6 | R5 | R4 | R3 | R2 | R1 | |
|---|---|---|---|---|---|---|---|---|
| 15 | 1 | 1 | 1 | 1 | 1 | 1 | 1 | FR → 127 |

| | G7 | G6 | G5 | G4 | G3 | G2 | G1 | |
|---|---|---|---|---|---|---|---|---|
| 16 | 1 | 1 | 1 | 1 | 1 | 1 | 1 | FG → 127 |

| | B7 | B6 | B5 | B4 | B3 | B2 | B1 | |
|---|---|---|---|---|---|---|---|---|
| 17 | 0 | 0 | 0 | 0 | 0 | 0 | 0 | FB → 0 |

Y → 111

DW ~ 1101111

| | D9 | D8 | D7 | D6 | D5 | D4 | D3 | D2=R0 | D1=G0 | D0=B0 |
|---|---|---|---|---|---|---|---|---|---|---|
| 20 | 1 | 1 | 0 | 1 | 1 | 1 | 1 | 1 | 1 | 0 |

18     19

METHOD AND ARRANGEMENT FOR IMPROVING THE GRAYSCALE RESOLUTION OF A MONOCHROME MONITOR

This application claims priority under 35 U.S.C. §119(a) to German Patent Application No. 10 2007 025 504.9, filed on Jun. 1, 2007, the entire contents of which are hereby incorporated by reference.

BACKGROUND OF THE INVENTION

1. Field of the Invention

The invention relates to a method and arrangement for improving the digital-signal-generated grayscale resolution of a monochrome visual display unit to which the digital signals from an image source can be supplied over an n-bit wide RGB wire pair.

2. Description of the Related Art

In the medical field, monochrome visual display units, which must meet very high requirements in terms of grayscale resolution, are used particularly to interpret X-ray images. For this type of use, monochrome visual display units are superior to color units. The current requirements in terms of grayscale resolution call for 10-bit wide grayscale signals, enabling 1024 grayscale gradations on a monochrome visual display unit.

If such a monochrome visual display unit is connected to a 24-bit color-image source by a DVI cable (Digital Video Interface cable), which has one wire pair for each 8-bit wide RGB channel, it is not possible to visually represent all the RGB color information transmitted to the monochrome visual display unit in a "correct" grayscale on that visual display unit. This means that information is lost, which can have a disturbing effect on a viewer. For example, RGB signals with color information (0, 255, 0), (255, 255, 0) or (0, 255, 255), which a color visual display unit displays as the colors green, yellow and turquoise, appear white on a monochrome visual display unit.

SUMMARY OF THE INVENTION

An aspect of the present invention is to provide a method and arrangement of the above-described type, which displays distinguishable grayscale gradations on a monochrome visual display unit regardless of whether a grayscale signal or RGB color signals are transmitted to that monochrome visual display unit.

According to one formulation, the method includes generating n-bit-wide RGB color signals for transmission of an input m-bit-wide grayscale signal with an encoding device of the image source and generating an output m-bit-wide grayscale signal from the received n-bit-wide RGB color signals with a decoding device of the visual display unit. According to a further formulation, the arrangement includes a monochrome visual display unit, an image source, which supplies digital signals to the monochrome visual display unit over n-bit-wide RGB channels, an encoding device of the image source generating n-bit-wide RGB color signals for transmission of an input m-bit-wide grayscale signal and a decoding device of the visual display unit for generating an output m-bit-wide grayscale signal from the received n-bit-wide RGB color signals.

The advantage is that no color information is lost and for each piece of color information, a grayscale gradation is displayed on the monochrome visual display unit that corresponds to that piece of color information.

Advantageous embodiments of the invention are set forth in the dependent claims.

BRIEF DESCRIPTION OF THE DRAWINGS

Embodiments and advantages of the invention will now be described in greater detail with reference to non-limiting embodiments depicted in the drawings, in which:

FIGS. 2 and 3 illustrate process steps for encoding and decoding a digital signal.

DETAILED DESCRIPTION OF EXEMPLARY EMBODIMENTS

Figure 1:
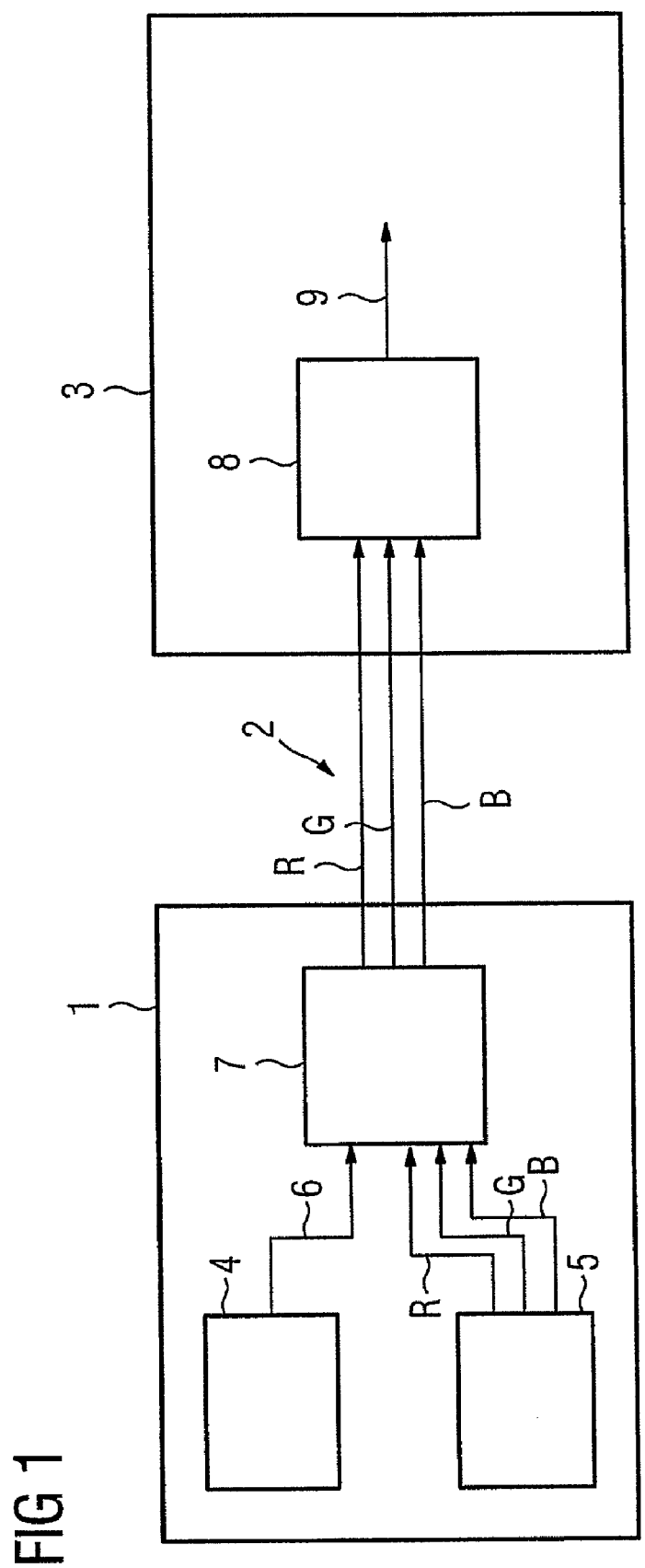
FIG. 1 schematically shows an arrangement with an image source and a monochrome visual display unit.

An image source 1 in the form of a personal computer with a suitable graphics card is connected to a monochrome visual display unit 3 in the form of an LCD display module by means of a DVI cable 2, which is known in the art. The DVI cable 2 has three 8-bit wide RGB channels over which the image source 1 transmits a digital RGB signal to the monochrome visual display unit 3.

An image source 1 runs an application program 4 to process and display a black and white X-ray image and a Windows application 5 to display, for example, icons on the visual display unit 3. The Windows application generates digital RGB color information, which the image source 1 transmits via an encoding device 7 to the visual display unit 3 in the form of 8-bit wide RGB signals. In contrast, the application program 4 generates a 10-bit wide grayscale signal 6. The encoding device 7 of the image source 1 processes this grayscale signal 6 as well as the 8-bit wide RGB signals and supplies them to a decoding device 8 of the visual display unit 3 over the three 8-bit wide RGB channels of the cable 2. The decoding device 8 processes the signals transmitted by the encoding device 7 and generates a 10-bit wide grayscale signal 9 to display corresponding monochrome image information on a display of the visual display unit 3.

To make it possible to display distinguishable grayscale gradations on the visual display unit 3 regardless of whether a grayscale signal or an RGB color signal is transmitted to the visual display unit 3 over the RGB channels, the signals are suitably processed by the encoding and decoding devices. In the following we refer to FIGS. 2 and 3, which illustrate an encoding and decoding of a grayscale signal or of RGB color signals.

An encoding device processes a 10-bit wide grayscale signal 10 generated by an application program in such a way that the encoding device uses, respectively, seven bit locations D3, D4, ... D9 with associated bit values of the grayscale signal 10 and, further, one of the bit locations D0, D1, D2 of the grayscale signal 10 with associated bit value to form an RGB signal (FIG. 2). This means that the bit values of the bit locations R7, R6, ..., R1 of the R signal, the bit values of the bit locations G7, G6, ..., G1 of the G signal and, further, the bit values of the bit locations B7, B6, ..., B1 of the B signal match and only the respective bit value of the bit locations R0, G0, B0 differ. In the present example, the encoding device generates an R signal "01111111," a G signal "01111110" and a B signal "01111111" and transmits the R signal over the R channel, the G signal over the G channel and the B signal over the B channel of a decoding device of a visual display unit, which uses these RGB color signals to generate a grayscale signal 11.

The decoding of RGB color information in the form of 8-bit wide RGB color signals 12, 13, 14 (FIG. 3) will now be discussed in detail. It is assumed that a Windows application supplied the RGB color signals 12, 13, 14 to an encoding device, and the encoding device transmitted these signals 12, 13, 14 to a decoding device over RGB channels. The decoding device uses these RGB color signals 12, 13, 14 to generate a grayscale signal 20 by first generating a respective reference value, for example, in the form of a color decimal value FR, FG, FB, from the bit values 15 of the bit locations R7, R6, ..., R1, the bit values 16 of the bit locations G7, G6, ..., G1 and the bit values 17 of the bit locations B7, B6, ..., B1. In the present example, the resulting decimal color values are FR=127, FG=127 and FB=0. The decoding device adds these decimal color values FR, FG, FB using weighted addition, according to the following formula:

$$Y=a*FR+b*FG+c*FB$$

to form the associated binary value DW. In a practical example of the invention, the factor a is selected as ⅖, the factor b as ⅝ and the factor c as ⅛, so that the result of the weighted addition Y is the decimal number 111. The associated binary number DW is 1101111, the bit combination of which forms the bit values 18 of the seven bit locations D9, D8, ..., D3 of the 10-bit wide grayscale signal 20 to be generated. These seven bit values 18 are supplemented by the respective bit values 19 of the bit locations R0, G0, B0, such that the grayscale signal 20 is generated by decoding the RGB color signal 12, 13, 14.

The decoding device decodes the RGB color signals according to FIG. 1 in the same manner and generates the grayscale signal 11, which corresponds to the grayscale signal 10 from which the encoding device generated the RGB color signals.

The above description of the preferred embodiments has been given by way of example. From the disclosure given, those skilled in the art will not only understand the present invention and its attendant advantages, but will also find apparent various changes and modifications to the structures and methods disclosed. The applicant seeks, therefore, to cover all such changes and modifications as fall within the spirit and scope of the invention, as defined by the appended claims, and equivalents thereof.

What is claimed is:

1. A method for improving digital-signal-generated grayscale resolution of a monochrome visual display unit, to which digital signals from an image source are supplied over n-bit-wide RGB channels, comprising:

generating with an encoding device of the image source n-bit-wide RGB color signals for transmission of an input m-bit-wide grayscale signal over the RGB channels, m being larger than n, the encoding device being configured to form each of the RGB color signals from the bit values of n−1 bit locations (D9, D8, ..., D3) of the input m-bit-wide grayscale signal, such that the bit values of the n−1 bit locations of each of the R color signal, the G color signal and the B color signal match to the bit values of n−1 bit locations (D9, D8, ..., D3) of the input m-bit-wide grayscale signal, and that the bit value of the only remaining one bit location of each of the R color signal, the G color signal, and the B color signal match to the bit value of only one of the remaining bit values of m−(n−1) bit locations (D2, D1, D0) of the input m-bit-wide grayscale signal, wherein all of the remaining bit values m−(n−1) bit locations (D2, D1, D0) of the input m-bit-wide grayscale signal are used among each of the R color signal, the G color signal, and the B color signal;

generating with a decoding device of the monochrome visual display unit an output m-bit-wide grayscale signal from the received n-bit-wide RGB color signals, the decoding device being configured to form bit values for n−1 bit locations of the output m-bit-wide grayscale signal from the bit values of n−1 bit locations of the n-bit-wide RGB color signals according to a processing rule, and to supplement these n−1 bit locations by the respective bit value of the remaining bit locations of the respective n-bit-wide RGB color signal; and displaying with the monochrome visual display unit the output m-bit-wide grayscale signal.

2. The method as claimed in claim 1, wherein the decoding device forms reference numbers (FR, FG, FB) from the respective bit values of the n−1 bit locations of the n-bit-wide RGB color signals according to the processing rule, wherein the decoding device determines a weighted reference number from the reference numbers (FR, FG, FB), and converts the weighted reference number into a binary number, the bit combination of which forms the bit values of the n−1 bit locations (D9, D8, ..., D3) of the output m-bit-wide grayscale signal.

3. The method as claimed in claim 2, wherein the reference numbers (FR, FG, FB) are decimal numbers, from which the decoding device determines a weighted decimal number (Y) using the formula:

$$Y=a*FR+b*FG+c*FB;$$

where a+b+c=1.

4. An arrangement improving digital-signal-generated grayscale resolution, comprising:

a monochrome visual display unit;

an image source, which supplies digital signals to the monochrome visual display unit over n-bit-wide RGB channels;

an encoding device of the image source generating n-bit-wide RGB color signals for transmission of an input m-bit-wide grayscale signal over the RGB channels, m being larger than n, the encoding device being configured to form each of the RGB color signals from the bit values of n−1 bit locations (D9, D8, ..., D3) of the input m-bit-wide grayscale signal, such that the bit values of the n−1 bit locations of each of the R color signal, the G color signal and the B color signal match to the bit values of n−1 bit locations (D9, D8, ..., D3) of the input m-bit-wide grayscale signal, and that the bit value of the only remaining one bit location of each of the R color signal, the G color signal, and the B color signal match to the bit value of only one of the remaining bit values of m−(n−1) bit locations (D2, D1, D0) of the input m-bit-wide grayscale signal, wherein all of the remaining bit values m−(n−1) bit locations (D2, D1, D0) of the input m-bit-wide grayscale signal are used among each of the R color signal, the G color signal, and the B color signal; and a decoding device of the monochrome visual display unit for generating an output m-bit-wide grayscale signal from the received n-bit-wide RGB color signals, the decoding device being configured to form bit values for n−1 bit locations of the output m-bit-wide grayscale signal from the bit values of n−1 bit locations of the n-bit-wide RGB color signals according to a processing rule, and to supplement these n−1 bit locations by the respective bit value of the remaining bit locations of the respective n-bit-wide RGB color signal, wherein the monochrome visual display unit displays the output m-bit-wide grayscale signal.

5. The arrangement as claimed in claim 4,
wherein the decoding device forms reference numbers (FR, FG, FB) each from the respective bit values of the n−1 bit locations of the n-bit-wide RGB color signals according to the processing rule,
wherein the decoding device determines a the weighted reference number from the reference numbers (FR, FG, FB) and converts the weighted reference number into a binary number, the bit combination of which forms the bit values of the n−1 bit locations (D9, D8, ... , D3) of the output m-bit-wide grayscale signal.

6. The arrangement as claimed in claim 5, wherein the reference numbers (FR, FG, FB) are decimal numbers, from which the decoding device determines a weighted decimal number using the formula:

$$Y=a*FR+b*FG+c*FB;$$

where a+b+c=1.

7. An arrangement for transmitting a grayscale signal and a color signal comprising:
an image source;
a monochrome visual display unit; and
RGB channels;
wherein the image source comprises an application program for generating a grayscale signal, an application program for generating a color signal, and an encoding device that generates n-bit wide RGB color signals for transmission of an input m-bit-wide grayscale signal over the RGB channels, m being larger than n, the encoding device being configured to form each of the RGB color signals from the bit values of n−1 bit locations (D9, D8, ... , D3) of the input m-bit-wide grayscale signal such that the bit values of the n−1 bit locations of each of the R color signal the G color signal and the B color signal match to the bit values of n−1 bit locations (D9, D8, ... , D3) of the input m-bit-wide grayscale signal and that the bit value of the only remaining one bit location of each of the R color signal the G color signal and the B color signal match to the bit value of only one of the remaining bit values of m−(n−1) bit locations (D2, D1, D0) of the input m-bit-wide grayscale signal wherein all of the remaining bit values m−(n−1) bit locations (D2, D1, DO) of the input m-bit-wide grayscale signal are used among each of the R color signal the G color signal and the B color signal;
wherein the monochrome visual display unit comprises a decoding device that generates an output m-bit-wide grayscale signal from the received n-bit wide RGB color signals, the decoding device being configured to form bit values for n−1 bit locations of the output m-bit-wide grayscale signal from the bit values of n−1 bit locations of the n-bit-wide RGB color signals according to a processing rule, and to supplement these n−1 bit locations by the respective bit value of the remaining bit locations of the respective n-bit-wide RGB color signal;
wherein the input m-bit-wide grayscale signal is encoded and transmitted from the image source to the monochrome visual display unit via the RGB channels with the bit width of the color signal, and
wherein the output m-bit-wide grayscale signal is decoded after a transmission via the RGB channels by the decoding device and converted to a decoded signal having the bit width of the output m-bit-wide grayscale signal, and wherein the monochrome visual display unit displays the decoded grayscale signal.

8. The arrangement as claimed in claim 7, wherein the bit width of the grayscale signal is 10 bit, and
wherein the bit width of the color signal is 8 bit.

9. The arrangement as claimed in claim 7, wherein a bit width of the RGB channels is 8 bit.

* * * * *